(12) United States Patent
Chao

(10) Patent No.: US 10,152,741 B2
(45) Date of Patent: Dec. 11, 2018

(54) E-COMMERCE SYSTEM

(71) Applicant: Hsien-Ta Chao, Taipei (TW)

(72) Inventor: Hsien-Ta Chao, Taipei (TW)

( * ) Notice: Subject to any disclaimer, the term of this patent is extended or adjusted under 35 U.S.C. 154(b) by 404 days.

(21) Appl. No.: 15/203,809

(22) Filed: Jul. 7, 2016

(65) Prior Publication Data

US 2018/0012286 A1    Jan. 11, 2018

(51) Int. Cl.
G06Q 30/00      (2012.01)
G06Q 30/06      (2012.01)
G06Q 10/08      (2012.01)

(52) U.S. Cl.
CPC ....... G06Q 30/0633 (2013.01); G06Q 10/087 (2013.01); *G06Q 30/0641* (2013.01)

(58) Field of Classification Search
CPC ................ G06Q 30/0633; G06Q 30/0641
USPC .................................... 705/26.8, 27.1
See application file for complete search history.

(56) References Cited

U.S. PATENT DOCUMENTS 8,364,559 B1 * 1/2013 Bhosle ................ G06Q 30/00
                                                    705/26.63
2007/0043583 A1 * 2/2007 Davulcu ........... G06F 17/30864
                                                    705/1.1
2010/0153238 A1 * 6/2010 Zaghloul .............. G06Q 10/00
                                                    705/28
2014/0297465 A1 * 10/2014 Stocker ................. G06Q 20/12
                                                    705/26.8

OTHER PUBLICATIONS

Expedia unveils EAN Smart Cross Sell, Feb. 3, 2012, Normans Media Ltd (Year: 2012).*

* cited by examiner

*Primary Examiner* — Brittney N Miller
(74) *Attorney, Agent, or Firm* — Winston Hsu

(57) ABSTRACT

A computer implemented system for e-commerce includes a server hosting a system management domain, and a number of domains. A first domain provides a first website displaying a plurality of products for purchase using a first shopping cart provided by the system management domain. A second domain provides a second website displaying a plurality of products for purchase using a second shopping cart provided by the system management domain. The system management domain may display on the first website a link pointing to a product displayed by the second website when certain conditions exist. When the link is followed to the second website, the first shopping cart is used for purchases at the second website.

8 Claims, 3 Drawing Sheets

E-COMMERCE SYSTEM

BACKGROUND OF THE INVENTION

1. Field of the Invention

This application relates to a method and a computer implemented system applicable to e-commerce where a system management domain hosted by a server modifies independent domains hosted on the same server.

2. Description of the Prior Art

Existing e-commerce methods may display a link on a first website pointing to a product displayed by a second website, but fail to give the first website credit for the referral while effectively displaying more products on the first website than are in the inventory of the first website by modifying the second website to use first shopping cart at the second website when the link is followed.

SUMMARY OF THE INVENTION

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

A computer implemented system comprises a system management domain hosted on a server, a first domain hosted on the server with the first domain configured to provide a first website displaying a first plurality of products for purchase using a first shopping cart provided by the system management domain, the first shopping cart indicated as belonging exclusively to the first website, and a second domain hosted on the server, the second domain configured to provide a second website displaying a second plurality of products for purchase using a second shopping cart provided by the system management domain, the second shopping cart indicated as belonging exclusively to the second website.

The system management domain may be configured to provide a checkout service for the first shopping cart and provide a receipt indicated as being from the first website for products purchased using the first shopping cart. The system management domain may further provide a checkout service for the second shopping cart and provide a receipt indicated as being from the second website for products purchased using the second shopping cart. Additionally, the system management domain is further configured to maintain a database indicating in-stock quantities of the first plurality of products for purchase at the first website and in-stock quantities of the second plurality of products for purchase at the second website.

The system management domain may be further configured to display on the first website a link pointing to a product of the second plurality of products displayed by the second website, and when the link pointing to the product of the second plurality of products displayed by the second website is followed, the first shopping cart is used for a purchase made on the second website. When the first shopping cart is used for the purchase made on the second website, the receipt indicated as being from the first website for products purchased using the first shopping cart further indicates that the purchase was made at the second website.

A method of operating computer implemented e-commerce system comprises hosting a system management domain, a first domain, and a second domain on a server. The first domain is configured to provide a first website displaying a first plurality of items for purchase using a first shopping cart provided by the system management domain, the first shopping cart indicated as belonging exclusively to the first website. The second domain is configured to provide a second website displaying a second plurality of items for purchase using a second shopping cart provided by the system management domain, the second shopping cart indicated as belonging exclusively to the second website.

The method may further comprise configuring the system management domain to provide a checkout service for the first shopping cart and provide a receipt indicated as being from the first website for items purchased using the first shopping cart and configuring the system management domain to provide a checkout service for the second shopping cart and provide a receipt indicated as being from the second website for items purchased using the second shopping cart.

The method may further comprise configuring the system management domain to maintain a database indicating in-stock quantities of the first plurality of items for purchase at the first website and configuring the system management domain to maintain a database indicating in-stock quantities of the second plurality of items for purchase at the second website.

The method may further comprise the system management domain displaying a link on the first website pointing to an item of the second plurality of items displayed by the second website and using the first shopping cart for a purchase made on the second website when the link pointing to the item of the second plurality of items displayed by the second website is followed. The method may further comprise indicating that the purchase was made at the second website on the receipt indicated as being from the first website when the first shopping cart is used for the purchase made on the second website.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
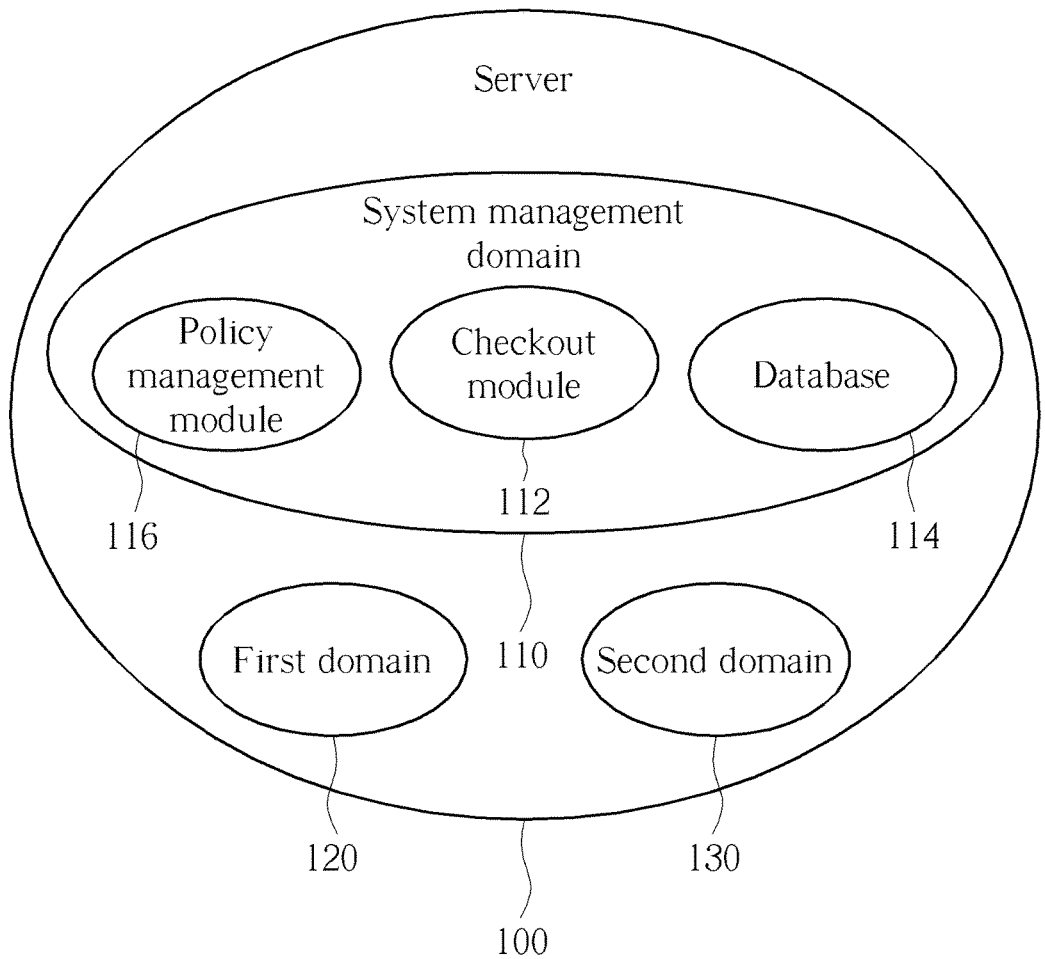
FIG. 1 is a functional block diagram of a computer implemented system for e-commerce.

A computer implemented system for e-commerce preferably comprises a single server hosting a system management domain, and a number of domains. In the example shown in FIG. 1, a server 100 hosts a system management domain 110, a first domain 120, and a second domain 130, although any number of domains may be used and although use of a single server is preferred, more than one server may be used according to design considerations.

Figure 2:
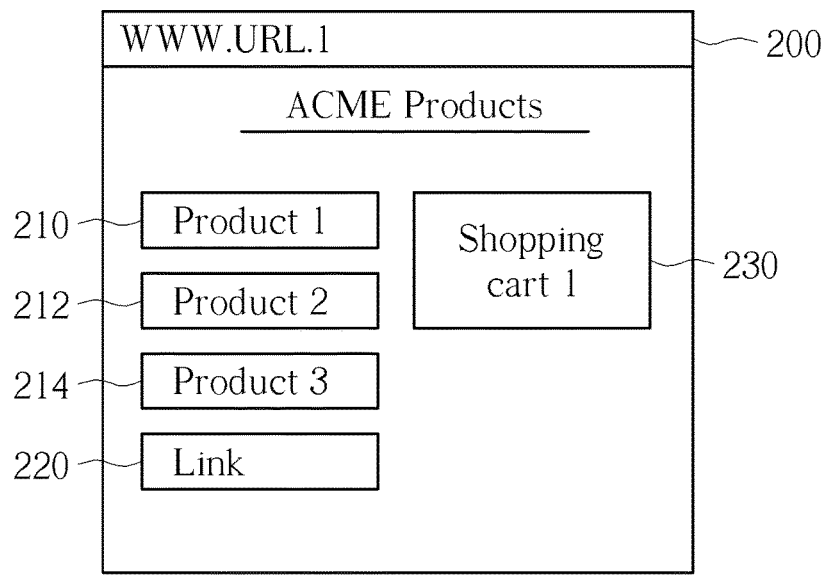
FIG. 2 illustrates a first website generated by the first domain.

The first domain 120 is configured to provide a first website 200, shown in FIG. 2, displaying a first plurality of products 210-214 for purchase using a first shopping cart 230 provided by a checkout module 112 of the system management domain 110, the first shopping cart 230 indicated as belonging exclusively to the first website 200.

Figure 3:
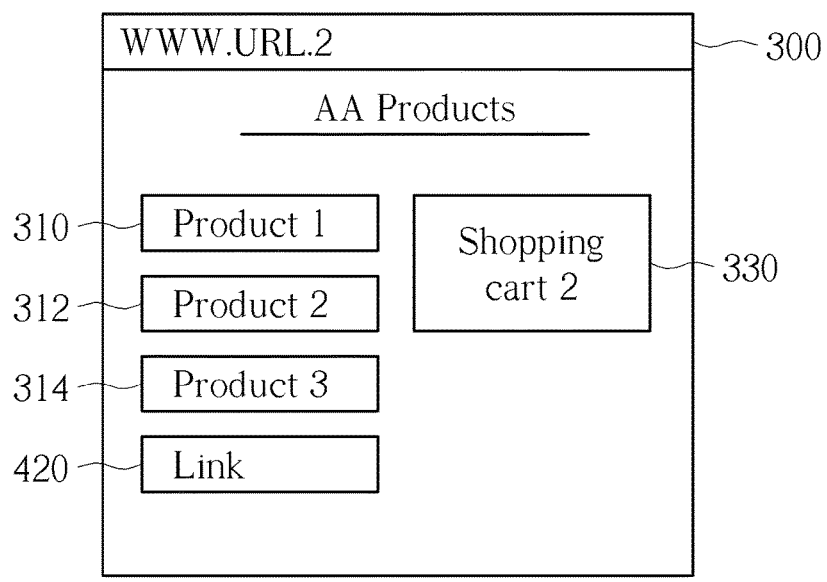
FIG. 3 illustrates a second website generated by the second domain.

The second domain 130 is configured to provide a second website 300, shown in FIG. 3, displaying a second plurality of products 310-314 for purchase using a second shopping cart 330 provided by the checkout module 112 of the system management domain 110, the second shopping cart 330 indicated as belonging exclusively to the second website 300. The checkout module 112 is configured to handle the financial transactions that occur for a purchase using a shopping cart provided by the checkout module 112, record the transaction in the data base, and to provide an appropriate receipt to the customer. Although FIG. 2 and FIG. 3 each show three products for sale on their respective websites, it should be readily appreciated that any suitable number of products may be listed for sale on any website according to design considerations. Products displayed on the first website 200 and the second website 300 may be the same or may be different.

The system management domain 110 is configured to provide a checkout service 112 for the first shopping cart 230 and provides a receipt indicated as being from the first website 200 for products purchased using the first shopping cart 230. The system management domain 110 also provides a checkout service 112 for the second shopping cart 330 and provides a receipt indicated as being from the second website 300 for products purchased using the second shopping cart 330. The system management domain 110 is further configured to maintain a database 114 indicating in-stock quantities of the first plurality of products 210-214 for purchase at the first website 200 and in-stock quantities of the second plurality of products 310-314 for purchase at the second website 300. The system management domain is further configured to display on the first website 200 a link 220 pointing to a product 310-314 of the second plurality of products displayed by the second website 300.

Figure 4:
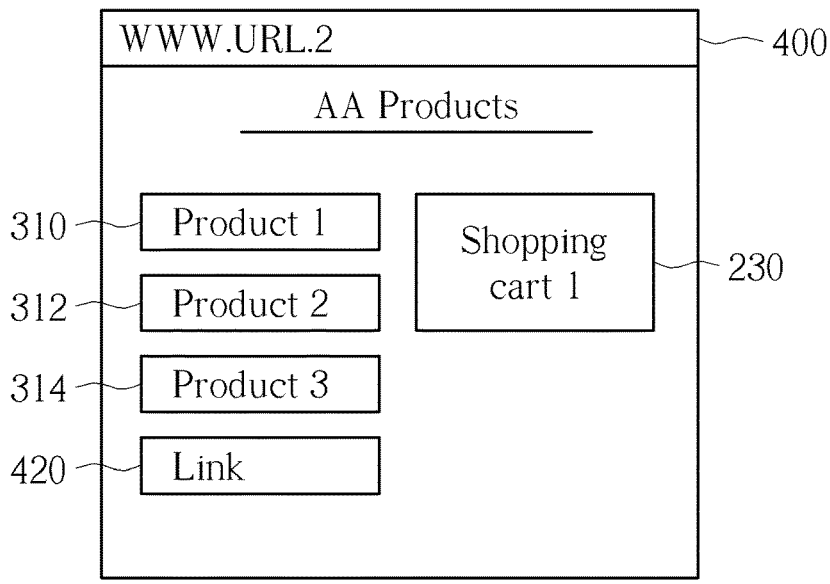
FIG. 4 illustrates a second website generated by the second domain when accessed via a link from the first website generated by the first domain.
Figure 5:
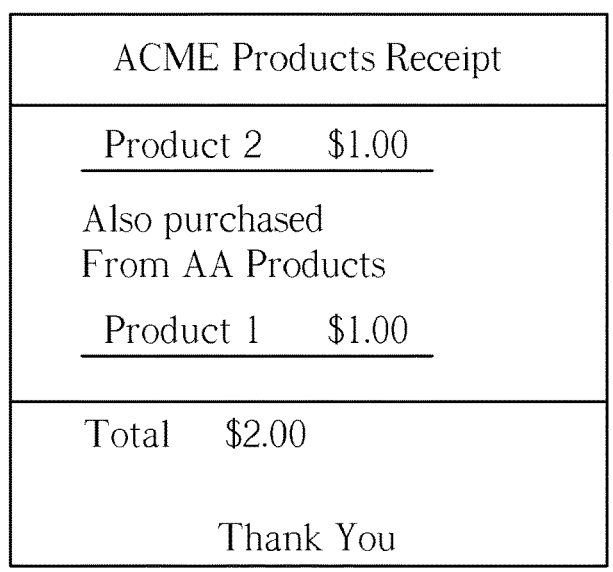
FIG. 5 illustrates an example receipt for purchases made at both the first and second websites.

FIG. 4 illustrates how the system management domain 110 modifies the second website 300 into a website 400 when the link 220 displayed on the first website 200 pointing to the product 310-314 of the second plurality of products displayed by the second website 300 is followed by a user so as to access the second website 300. When modified like this, the first shopping cart 230 is the only shopping cart displayed on the modified website 400. When second domain 130 is accessed via the link 220, the system management domain 100 provides the first shopping cart 230 for display by the second website 300 instead of the second shopping cart 330 that would be provided is the user arrived at the second website 300 directly (instead of following the link). The first shopping cart 230 is then used for a purchase made on the second website 300. When the first shopping cart 230 is used for the purchase made on the second website 300, the receipt indicated as being from the first website 200 for products purchased using the first shopping cart 230 may further indicate that the purchase was made at the second website 300. A sample of such a receipt 500 is shown in FIG. 5.

The system management domain 110 may be further configured to display on the first website 200 a link 220 pointing to the product 310-314 of the second plurality of products displayed by the second website 300 whenever certain conditions arise, as determined by a policy management module 116 of the system management domain 110. Possible conditions arising that cause a link to be displayed include at least one of, inter alia, when the system management domain 110 database 114 indicates quantity of the product at the first website 200 is below a predetermined threshold, when the system management domain 110 database 114 indicates a shipping distance of the product at the first website 200 to a buyer is greater than a shipping distance of the product at the second website 300 to the buyer, and when the system management domain 110 database 114 indicates the second website 300 provides products related to the product but not provided by the first website 200.

When the link 220 on the first website 200 pointing to the product 310-314 of the second plurality of products displayed by the second website 300 is followed to the second website 300, the system management domain 110 is further configured to display on the second website 300 a link 420 pointing to another product of a third plurality of products displayed by a third website and the first shopping cart 230 is used for a purchase made on the third website when the link 420 to the third website is followed.

A method implementing an e-commerce system may include hosting a system management domain 110, a first domain 120, and a second domain 130 on a server 100. The first domain is configured to provide a first website 200 displaying a first plurality of items 210-214 for purchase using a first shopping cart 230 provided by the system management domain 110, the first shopping cart 230 indicated as belonging exclusively to the first website 200. The second domain 130 is configured to provide a second website 300 displaying a second plurality of items 310-314 for purchase using a second shopping cart 330 provided by the system management domain 110, the second shopping cart 330 indicated as belonging exclusively to the second website 300.

The system management domain 110 is configured to provide a checkout service for the first shopping cart 230 and provide a receipt indicated as being from the first website 200 for items purchased using the first shopping cart 230 and to provide a checkout service for the second shopping cart 330 and provide a receipt indicated as being from the second website 300 for items purchased using the second shopping cart 330. The system management domain 110 is configured to maintain a database 114 indicating in-stock quantities of the first plurality of items 210-214 for purchase at the first website 200 and in-stock quantities of the second plurality of items 310-314 for purchase at the second website 300.

When at least one of the conditions previously stated occurs, the system management domain 110 may display a link 220 on the first website 200 pointing to an item 310-314 of the second plurality of items displayed by the second website 300. The system management domain 110 may be further configured to display on the first website 200 a link 220 pointing to the product 310-314 of the second plurality of products displayed by the second website 300 whenever certain conditions arise, as determined by a policy management module 116 of the system management domain 110. Possible conditions arising that cause a link to be displayed include at least one of, inter alia, when the system management domain 110 database 114 indicates quantity of the product at the first website 200 is below a predetermined threshold, when the system management domain 110 database 114 indicates a shipping distance of the product at the first website 200 to a buyer is greater than a shipping distance of the product at the second website 300 to the buyer, and when the system management domain 110 database 114 indicates the second website 300 provides products related to the product but not provided by the first website 200.

The method may further comprise the system management domain 110 displaying on the second website 300 a link pointing to another product of a third plurality of products displayed by a third website and the first shopping cart 230 is used for a purchase made on the third website when the link pointing to the product of the second plurality of products displayed by the second website 300 is followed to the second website and the link pointing to the another product of the third plurality of products displayed by the third website is followed to the third website.

A computer implemented system for e-commerce is disclosed. The system management domain may display on a first website a link pointing to a product displayed by a second website when certain conditions exist. When the link is followed to the second website, the first shopping cart is used for purchases at the second website, giving the first website credit for the referral while effectively displaying more products than are in the inventory of the first website.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer implemented system comprising:
   a server, wherein the server hosts a system management domain, wherein the system management domain is configured to maintain a database;
   a first domain hosted on the server, the first domain configured to provide a first website displaying a first plurality of products for purchase using a first shopping cart provided by the system management domain, the first shopping cart indicated as belonging exclusively to the first website; and
   a second domain hosted on the server, the second domain configured to provide a second website displaying a second plurality of products for purchase using a second shopping cart provided by the system management domain, the second shopping cart indicated as belonging exclusively to the second website;
   wherein the system management domain is further configured to:
      display, on the first web site, a link pointing to a product of the second plurality of products displayed at the second website when the database indicates one of:
         a quantity of the product at the first website is below a predetermined threshold,
         a shipping distance of the product at the first website to a buyer is greater than a shipping distance of the product at the second website to the buyer, or
         the second website provides products related to the product that are not provided by the first website;
      receive an indication of a selection of the link;
      in response to receiving the indication of the selection of the link, display the second website comprising at least the product of the second plurality of products;
      receive an indication of a desire to purchase the product of the second plurality of products displayed at the second website;
      in response to receiving the indication of the desire to purchase the product, add the product to the first shopping cart of the first website; and
      provide a checkout service for the first shopping cart.

2. The computer implemented system of claim 1, wherein the system management domain is further configured to:
   provide a receipt indicated as being from the first website for products purchased using the first shopping cart;
   provide a checkout service for the second shopping cart; and
   provide a receipt indicated as being from the second website for products purchased using the second shopping cart.

3. The computer implemented system of claim 2, wherein the database indicates in-stock quantities of the first plurality of products for purchase at the first website and in-stock quantities of the second plurality of products for purchase at the second website.

4. The computer implemented system of claim 1, wherein the system management domain is further configured to:
   in response to receiving the indication of the selection of the link, display on the second website a link pointing to another product of a third plurality of products displayed by a third website;
   receive an indication of a desire to purchase the another product of the third plurality of products displayed at the third website; and
   in response to receiving the indication of the desire to purchase the another product, add the another product to the first shopping cart of the first website.

5. A method comprising:
   hosting a system management domain on a server;
   maintaining, by the system management domain, a database;
   hosting a first domain on the server, wherein the first domain is configured to provide a first web site displaying a first plurality of items for purchase using a first shopping cart provided by the system management domain, the first shopping cart indicated as belonging exclusively to the first website;
   hosting a second domain on the server, wherein the second domain is configured to provide a second website displaying a second plurality of items for purchase using a second shopping cart provided by the system management domain, the second shopping cart indicated as belonging exclusively to the second website;
   displaying, by the system management domain, on the first website, a link pointing to an item of the second plurality of items displayed at the second website when the database indicates one of:
      a quantity of the item at the first website is below a predetermined threshold,
      a shipping distance of the item at the first website to a buyer is greater than a shipping distance of the item at the second website to the buyer, or
      the second website provides items related to the item that are not provided by the first website;
   receiving, by the system management domain, an indication of a selection of the link;
   in response to receiving the indication of the selection of the link, displaying, by the system management domain, the second website comprising at least the item of the second plurality of items;
   receiving, by the system management domain, an indication of a desire to purchase the item of the second plurality of items displayed at the second website;
   in response to receiving the indication of the desire to purchase the item, adding, by the system management domain, the item to the first shopping cart of the first website; and
   providing, by the system management domain, a checkout service for the first shopping cart.

6. The method of claim 5, further comprising:
providing, by the system management domain, a receipt indicated as being from the first website for items purchased using the first shopping cart;
providing, by the system management domain, a checkout service for the second shopping cart; and
providing, by the system management domain, a receipt indicated as being from the second website for items purchased using the second shopping cart.

7. The method of claim 6, wherein the database indicates in-stock quantities of the first plurality of items for purchase at the first website and in-stock quantities of the second plurality of items for purchase at the second website.

8. The method of claim 5, further comprising:
in response to receiving the indication of the selection of the link, displaying, by the system management domain, on the second website a link pointing to another item of a third plurality of items displayed by a third website;
receiving, by the system management domain, an indication of a desire to purchase the another item of the third plurality of items displayed at the third website; and
in response to receiving the indication of the desire to purchase the another item, adding, by the system management domain, the another item to the first shopping cart of the first website.

* * * * *